July 3, 1945.  A. L. SWEET ET AL  2,379,763
RESILIENT SUPPORT
Filed Sept. 7, 1942
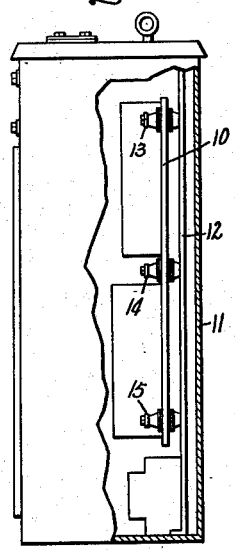
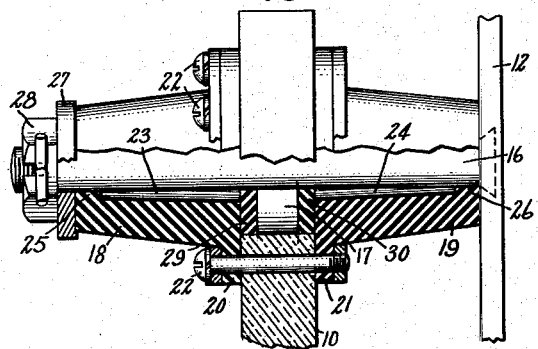
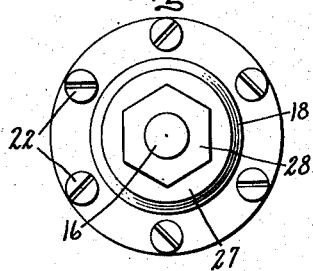
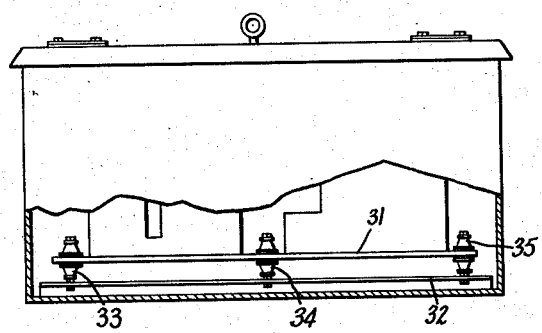
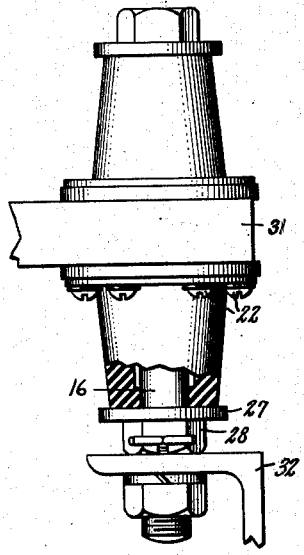
Inventors:
Alva L. Sweet,
Merton O. Bassett,
by Harry E. Dunham
Their Attorney Patented July 3, 1945

2,379,763

UNITED STATES PATENT OFFICE 2,379,763

RESILIENT SUPPORT

Alva L. Sweet and Merton O. Bassett, Schenectady, N. Y., assignors to General Electric Company, a corporation of New York Application September 7, 1942, Serial No. 457,593

7 Claims. (Cl. 248—358)

Our invention relates to resilient supports, more particularly to resilient supports for electrical apparatus, and has for its object a resilient support providing protection for electrical devices against heavy shocks.

More particularly, our invention relates to supports for panels carrying electric devices such as relays and contactors. In carrying out our invention in one form, we provide a plurality of pin supporting members secured to the supporting body and passing loosely through holes in the panel. The panel is secured to each of the pins by means of a pair of hollow members made of resilient material, such as rubber, which are secured on opposite sides of the panel around the hole in the panel so that the pin passes through them whereby the end of one of the resilient members engages the supporting body, while the end of the other resilient member engages a washer on the end of the pin. These hollow members provide a resilient support for the panel in a lateral direction. We may also provide a resilient support for the panel in the direction of its length consisting of a plurality of resilient washers mounted in the hole in the panel and closely surrounding the pin.

A desirable characteristic of this resilient mounting in the protection of electric apparatus is that it is stiff and unyielding with respect to forces up to predetermined values and thereafter collapses to provide for a period of increasing deflection without substantial increase in the applied force.

For a more complete understanding of our invention, reference should be had to the accompanying drawing, Fig. 1 of which is a side elevation view partly in section showing a control panel mounted in an enclosing cabinet on supports embodying our invention; Fig. 2 is an enlarged front elevation view partly in section of the support shown in Fig. 1; Fig. 3 is an end elevation view of the support shown in Fig. 2; Fig. 4 is a view similar to Fig. 1 but showing the panel mounted in a horizontal position; while Fig. 5 is an enlarged front elevation view partly in section of the supporting means shown in Fig. 4.

Referring to the drawing, we have shown our invention in one form as applied to the supporting of a supported body or panel 10 in an enclosing metal cabinet 11. It will be understood that the panel 10 has electric devices, such as contactors and relays, mounted on it. The panel is mounted in the cabinet 11 on a suitable supporting body or bar 12. As shown, six supports at spaced points along the periphery of the panel are provided, only three of these supports 13, 14 and 15 on one side of the panel being shown. It will be further observed that this support holds the panel in a substantially vertical position.

Referring particularly to Fig. 2, each of the supports comprises a central pin or rod 16 constituting a supporting body which is secured at its right-hand end, as seen in the drawing, to the supporting bar 12. This pin passes centrally through an aperture 17 in the panel 10, this aperture being considerably larger than the pin. For the purpose of resiliently securing the panel to the pin, hollow truncated cone-shaped members 18 and 19 are provided around the pin on opposite sides of the panel. These members are provided with flanges 20 and 21 around their bases by means of which they are secured by bolts 22 to the panel around the aperture 17 and concentric with the aperture. The two members 18 and 19 are identical in construction. They are made from a suitable resilient material, preferably rubber. The central apertures 23 and 24 in these members are concentric with the pin 16 and are appreciably larger than the pin except at the outer ends of the members where portions 25 and 26 are provided which closely engage the pin.

The resilient members attached to the panel are held on the pin 16 by means of a washer 27, forming a flange member, and a nut 28 which is turned against the washer until the ends of the two resilient supports are clamped lightly between the supporting body or member 12 and the washer. The nut 28 is pinned by a cotter pin or equivalent to maintain it in the desired relation to members 18 and 19. The two members 18 and 19 thus support the panel in a direction perpendicular to the panel itself, i. e., in a substantially horizontal direction.

In order to support the panel in a vertical direction, i. e. in the plane of the panel, we may provide a multiplicity of thin resilient washers 29 and 30, also preferably made of rubber, which are inserted in the aperture 17. These washers may be omitted, particularly when the base is of thin material or the cone shaped members 18 and 19 are of sufficient strength and resilience to obviate the need for washers such as 29 and 30. Their outer peripheries fit snugly in the aperture 17 while their central apertures closely engage the pin 16. Sufficient space is provided for collapse of the washers and, as shown, the washers are spaced apart for that purpose.

We have found that a very desirable characteristic of supporting means for electric apparatus so as to prevent damage to the apparatus from heavy shocks is that the supporting means be substantially rigid with respect to forces up to a predetermined value and then collapsible to provide for a predetermined amount of relative movement between the supporting body and the apparatus being supported without increase in the force applied, and thereafter substantially rigid. This characteristic is provided by the hollow cone-shaped members 18 and 19 as well as by the washers 29 and 30. The initial rigidity is provided by making the wall of each of the members of sufficient thickness as compared with the weight of the panel 10 and the parts mounted on it. Thus, in the event of a great shock applied to the body carrying the apparatus and transmitted to the normally stationary cabinet 11 and the supporting part 12, the panel 10 is initially moved with the support 12 by the shock, there being but a gradual compression of the support 18 or 19, depending upon the direction of the shock. This means that the panel 10 starts to move at the beginning of the shock as contrasted with the operation if relatively soft rubber were used, in which case the rubber would be compressed at the beginning of the shock without substantial movement of the panel 10. However, the soft rubber would finally become compressed to a hard mass and thereafter serve as a substantially rigid connection during the final violence of the shock. This action is especially damaging to electric apparatus mounted on the panel.

Assume, for example, that a shock starts to move the supporting body 12 toward the left, as seen in Fig. 2, with great violence. In this direction, of course, the member 19 transmits the propelling force to the panel. The member 19, however, is initially sufficiently stiff and rigid to start movement of the panel 10 at the beginning of the shock and transmit to the panel 10 a force which increases in substantially direct ratio to the movement of the support 12. However, at some predetermined point in the shock, the force becomes so great that the compression wall of the hollow or tubular column represented by the member 19 buckles outward and collapses. This, for example, may be made to occur upon the application of about one-fourth of the total force of a shock of predetermined magnitude.

This buckling or collapsing action of the compression wall of the member 19 occurs as a peripheral enlargement around the support 19 at approximately midway of its length, the wall of the member stretching and substantially folding together. When it occurs, the resisting force of the member 19 against further compression not only does not increase materially but may actually decrease while the member 19 is being compressed a predetermined additional amount. As a result, over this period of collapsing action, the movement of the support 12 toward the left by the shock continues without increased force applied to the panel 10. This action, of course, occurs very quickly since the total time required for the support 12 to move its maximum amount by the shock toward the left may be only a small fraction of a second. The shock movement of the support 12 during the period of collapse of the member 19 may, for example, be about 40 per cent of its movement up to the time of collapse. Thereafter, as the support 12 continues its shock movement toward the left, the member 19 provides an appreciably rigid connection and transmits a rapidly increasing force to the panel with corresponding movement of the panel, the force increasing in substantially direct ratio to the movement of the support 12.

When the shock is in the opposite direction, i. e., toward the right as seen in Fig. 2, the member 18 transmits the force of the shock to the panel in the same manner as described in connection with the member 19.

The washers 29 and 30 provide a collapsing action somewhat similar but not as pronounced as provided with the cone-shaped members 18 and 19, although sufficient to prevent damage to the apparatus on the panel. We have found that ordinarily electric apparatus is more susceptible to damage from shocks applied laterally from the front to the rear, or vice versa, with respect to an upright panel and, consequently, we have utilized supports in that direction having the more pronounced collapsing action.

Fig. 4 shows the application of our invention to a panel 31 which is supported in a horizontal position on suitable angle bars 32. Here again supports 33, 34 and 35 are provided on each edge of the panel, the supports, as shown in Fig. 5, having the same construction as previously described in connection with Fig. 2.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

What we claim as new and desire to secure by Letters Patent of the United States is:

1. A resilient support comprising two members constituting respectively supported and supporting bodies, a first of said members being provided with an aperture through which the second of said members extends, a flexible hollow cone-shaped support on each side of said first member surrounding said second member, said cone-shaped supports having their bases secured to said first member with the other ends of said cone-shaped supports closely surrounding said second member whereby said members are flexibly secured together by said cone-shaped supports, and washers of resilient material in said aperture surrounding said second member for absorbing shocks at right angles to the center line of said cone-shaped supports.

2. A resilient support comprising two members constituting respectively supported and supporting bodies, a first of said members being provided with an aperture through which the second of said members extends, a flexible hollow cone-shaped support on each side of said first member surrounding said second member, said cone-shaped supports having their bases secured to said first member with the other ends of said supports closely surrounding said second member whereby said members are flexibly secured together by said cone-shaped supports, and washers of resilient material in said aperture surrounding said second member for absorbing shocks at right angles to the center line of said cone-shaped supports, said cone-shaped supports and said washers being arranged initially to form an appreciably rigid connection between said members but to collapse upon the application of a predetermined force to them by one of said members thereby to provide a predetermined amount of continued movement of said one member without substantial increase in the force applied to the other of said members.

3. A shock protecting support for a panel for electric apparatus comprising a pair of members made of resilient material in engagement with opposite sides of said panel, a supporting body provided with spaced members engaging the opposite ends of said resilient members, said resilient members absorbing shocks applied to said support in a direction perpendicular to the plane of said panel, and additional resilient members mounted between an edge of said panel and said supporting body for absorbing shocks in the direction of the plane of said panel, said resilient members each being substantially rigid thereby initially to transmit a shock applied by said supporting body to said panel with a force increasing in substantially direct ratio to the movement of the support up to a predetermined value at which said resilient member collapses during a predetermined amount of continued movement of the support and thereafter again provides a substantially rigid connection.

4. A shock protecting connection between supporting and supported bodies comprising a member made of resilient material, and means for securing opposite ends of said resilient member to said bodies respectively so that said resilient member is placed under compression by a shock force applied to said supporting body in a predetermined direction, said resilient member being constructed and arranged with a compression wall having a predetermined thickness with relation to the weight of the supported body thereby to form an initially substantially compression rigid connection between said bodies and transmit a shock force in said direction to said supported body upon movement of the supporting body by said shock force up to a predetermined value of said force at which value said compression wall collapses to provide a predetermined amount of continued movement of the supporting body in said direction without substantial increase in the force transmitted to the supported body after which said compression wall again provides a substantially rigid connection between the bodies during continued shock movement of the supporting body.

5. A shock protecting support for a supported body comprising two members made of resilient material for engagement with opposite sides of the supported body, and a supporting body provided with spaced parts engaging respectively the opposite ends of said resilient members so that said resilient members are placed under compression respectively by shock forces applied to said supporting body in opposite directions, said resilient members being each constructed and arranged with a compression wall having a predetermined thickness with relation to the weight of the supported body thereby to form an initially substantially compression rigid connection between said bodies and transmit a shock force to said supported body upon movement of the supporting body by said shock force up to a predetermined value of said force at which value its said compression wall collapses to provide a predetermined amount of continued movement of the supporting body in said direction without substantial increase in the force transmitted to the supported body after which said compression wall again provides a substantially rigid connection between the bodies during continued shock movement of the supporting body.

6. A shock protecting support for a panel for electric apparatus comprising a pair of tubular members made of resilient material having ends adjacent to each other engaging opposite sides of said panel, and a supporting body provided with spaced members engaging opposite ends of said tubular members so that said tubular members are respectively placed under compression by shock forces applied to said supporting body in opposite directions, said tubular members being constructed and arranged each with a compression wall having a predetermined thickness with relation to the weight of said supported body thereby to form connections which are initially substantially rigid against compression forces and transmit each a compression shock force to said panel upon movement of said supporting body by the shock force up to a predetermined value of the shock force at which value its said compression wall collapses to provide a predetermined amount of continued movement of said supporting body without substantial increase in the shock force transmitted to said panel after which said tubular member again provides a substantially rigid compression connection during continued shock movement of the supporting body.

7. A shock protecting support comprising a supporting body, a supported body provided with an aperture, a pin secured at one end to said supporting body and extending through said aperture, said pin being substantially smaller in diameter than said aperture, a pair of hollow cone-shaped members made of resilient material loosely surrounding said pin with their bases adjacent to each other and engaging opposite sides of said supported body, means securing the bases of said members to said supported body, flange means on the opposite end of said pin engaging the adjacent end of one of said cone-shaped members thereby to clamp said members against the supporting body so that said cone-shaped members are respectively placed under compression by shock forces applied to said supporting body in opposite directions, said cone-shaped members being constructed and arranged each with a compression wall having a predetermined thickness with relation to the weight of said supported body thereby to form connections between said bodies which are initially substantially rigid against compression forces and transmit each a compression shock force to said supported body upon movement of said supporting body by the shock force up to a predetermined value of the shock force at which value its said compression wall collapses to provide a predetermined amount of continued movement of said supporting body without substantial increase in the shock force transmitted to said supported body after which said compression wall again provides a substantially rigid connection between said bodies during continued shock movement of the supporting body.

ALVA L. SWEET.
MERTON O. BASSETT.